United States Patent
Nakamura

(10) Patent No.: US 10,257,411 B2
(45) Date of Patent: Apr. 9, 2019

(54) ELECTRONIC DEVICE, METHOD, AND STORAGE MEDIUM FOR CONTROLLING TOUCH OPERATIONS

(71) Applicant: CANON KABUSHIKI KAISHA, Tokyo (JP)

(72) Inventor: Tatsuya Nakamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 115 days.

(21) Appl. No.: 15/383,391

(22) Filed: Dec. 19, 2016

(65) Prior Publication Data
US 2017/0180634 A1  Jun. 22, 2017

(30) Foreign Application Priority Data

Dec. 22, 2015  (JP) ................. 2015-250331

(51) Int. Cl.
*H04N 5/232* (2006.01)
*G06F 1/16* (2006.01)
*H04N 5/262* (2006.01)
*G06F 3/041* (2006.01)
*G06F 3/16* (2006.01)

(52) U.S. Cl.
CPC ....... *H04N 5/23216* (2013.01); *G06F 1/1694* (2013.01); *G06F 3/0416* (2013.01); *H04N 5/23293* (2013.01); *H04N 5/2628* (2013.01); *G06F 3/165* (2013.01); *G06F 2200/1614* (2013.01); *G06F 2200/1637* (2013.01)

(58) Field of Classification Search
None
See application file for complete search history.

(56) References Cited

U.S. PATENT DOCUMENTS

| 2012/0119873 A1* | 5/2012 | Ramsdell | G08C 17/00 340/4.3 |
|---|---|---|---|
| 2012/0176401 A1* | 7/2012 | Hayward | G06T 3/0093 345/619 |
| 2012/0284789 A1* | 11/2012 | Kim | G06F 1/1694 726/19 |
| 2013/0232353 A1* | 9/2013 | Belesiu | G06F 1/1618 713/320 |
| 2013/0265250 A1* | 10/2013 | Ishikawa | G06F 3/041 345/173 |

(Continued)

FOREIGN PATENT DOCUMENTS

| JP | 2012-253716 A | 12/2012 | |
| JP | 2017117108 A * | 6/2017 | ........... G06F 1/1694 |

*Primary Examiner* — Cynthia Segura
(74) *Attorney, Agent, or Firm* — Canon USA, Inc., IP Division

(57) ABSTRACT

An electronic device includes a control unit that performs control to set the electronic device to a second state in a case where the electronic device is set to a first state and a detected orientation of the electronic device changes from a first orientation to a second orientation, set the electronic device to the first state in a case where the detected orientation changes from the second orientation to the first orientation, perform predetermined processing according to a touch operation performed on a display unit in a case where the electronic device is set to the first state, and not perform the predetermined processing even if the touch operation is performed on the display unit, in a case where the electric device is set to the second state.

25 Claims, 10 Drawing Sheets

(56) References Cited

U.S. PATENT DOCUMENTS

| | | | | |
|---|---|---|---|---|
| 2013/0293502 A1* | 11/2013 | Kitatani | ............... | G06F 3/0488 |
| | | | | 345/173 |
| 2014/0340320 A1* | 11/2014 | VanBlon | ............... | G06F 1/1626 |
| | | | | 345/173 |
| 2014/0351768 A1* | 11/2014 | Park | ..................... | G06F 3/0488 |
| | | | | 715/856 |
| 2015/0156552 A1* | 6/2015 | Wayans | ........... | H04N 21/47205 |
| | | | | 386/230 |
| 2015/0338988 A1* | 11/2015 | Lee | ..................... | G06F 1/1613 |
| | | | | 345/173 |
| 2016/0085360 A1* | 3/2016 | Deng | ..................... | G06F 3/044 |
| | | | | 345/174 |
| 2016/0179288 A1* | 6/2016 | Iida | ..................... | G06F 3/0488 |
| | | | | 345/173 |
| 2016/0253039 A1* | 9/2016 | Heo | ..................... | G06F 3/0412 |
| | | | | 345/173 |
| 2017/0094156 A1* | 3/2017 | Kim | ..................... | G06F 3/013 |
| 2017/0104922 A1* | 4/2017 | Matsushima | ...... | H04N 5/23216 |
| 2018/0184008 A1* | 6/2018 | Kondo | ............ | H04N 5/232935 |

\* cited by examiner

FIG.1
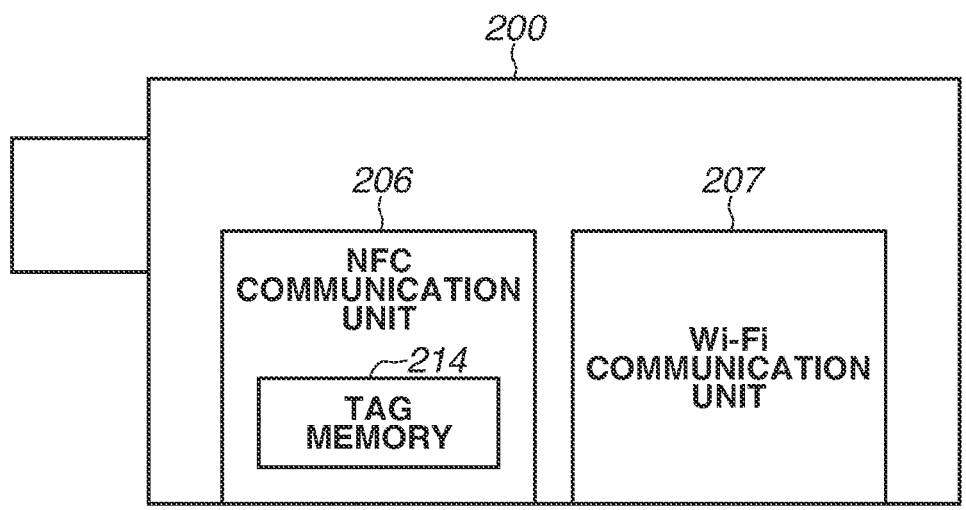
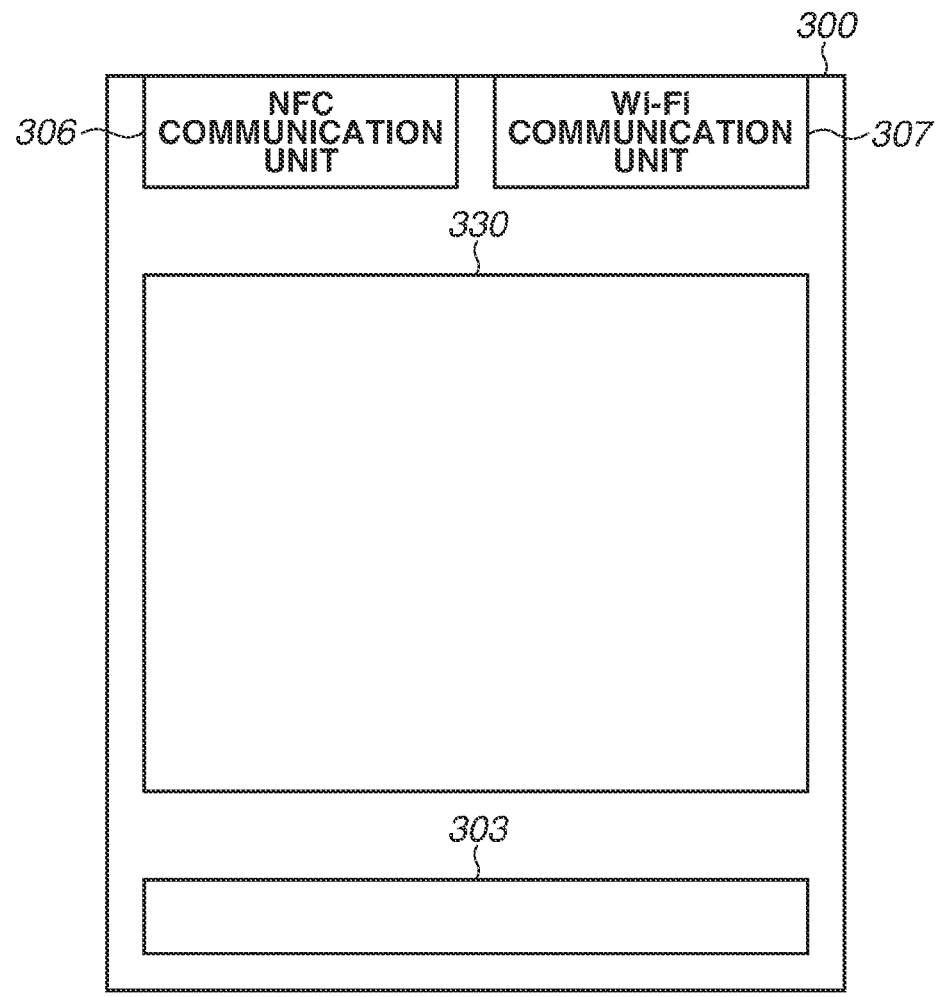

ELECTRONIC DEVICE, METHOD, AND STORAGE MEDIUM FOR CONTROLLING TOUCH OPERATIONS

BACKGROUND

Field

The present disclosure relates to an electronic device, a method for controlling the electronic device, and a storage medium that enable a user to operate the electronic device with a touch operation and that prevents an erroneous operation and an erroneous detection.

Description of the Related Art

Portable terminals, e.g., smartphones and tablet computers, have become popular and been widely used in recent image processing environments. The development of various related techniques will further promote the spread of the portable terminals. As characteristic features of these portable terminals, each user can select arbitrary application software (hereinafter, referred to as "application") and freely install the selected application on a portable terminal.

Software running on a central processing unit (CPU) incorporated in such a portable terminal has a configuration similar to that of a personal computer (PC). The software configuration can be roughly divided into an operating system (OS) layer and an application layer. Each user can enjoy various types of functional and convenient features that can be provided by a portable terminal when the user selects and installs an arbitrary application.

A touch panel attached to the terminal body is another feature of the above-described portable terminal. The touch panel is different from conventional buttons and switches in that the software provides various methods for inputting operational instructions. Therefore, there are various applications and operation procedures proposed for the portable terminals each being equipped with the touch panel.

As discussed in Japanese Patent Application Laid-Open No. 2012-253716, there is a conventional portable terminal that enables a user to perform input operations in the same manner as an ordinary remote controller if the terminal body is held in the vertical direction and can recognize gesture input operations performed on the touch panel if the terminal body is held in the horizontal direction, so that the user can perform various operations intuitively.

There are various touch panel-based applications proposed for digital still cameras that can record still images and digital video cameras that can record moving images. The software running on the CPU can provide various functions for these cameras to input operational instructions via the touch panel based on the content thereof. In this case, enhancing multiple functions and downsizing the camera body can be satisfied simultaneously.

Erroneous operations or erroneous detections can occur when a user performs an image related operation on the touch panel of the portable terminal discussed in Japanese Patent Application Laid-Open No. 2012-253716. For example, an erroneous operation can occur when a user holding a smartphone unintentionally touches the user's figure on an operational surface of the touch panel. The smartphone will perform a predetermined processing based on this unintended touch, which will result in implementation of an unintended operation.

A recent trend in smartphones has been to provide smartphones with sophisticated shapes that satisfy various requirements, e.g., downsizing, attractive product design, etc. Therefore, an external shape of the smartphone may not be suitable for a user to hold with the user's hand. In particular, to satisfy contradictory requirements of increasing the screen size of the touch panel while downsizing the smartphone body, a peripheral portion of the smartphone's touch panel is positioned in close proximity to an external periphery of the smartphone body. Therefore, when a user holds the smartphone, a user's finger can unintentionally touch the touch panel causing an unintended operation to be implemented.

Mobile terminals with touch panels, such as smartphones and tablets can be used in various conditions and in various situations. For example, to enable users to utilize mobile terminals in wet environments, e.g., in the rain, in recent years, waterproof mobile terminals have emerged in the marketplace. In addition, various waterproof cases have become available for mobile terminals that are not waterproof themselves. When a user uses a waterproofed mobile terminal in a wet environment, water droplets, etc., can adhere to the mobile terminal's touch panel. The adhesion of water droplets, etc., can be erroneously recognized as a touch operation by the user.

SUMMARY

Embodiments are directed to an electronic device, a method for controlling the electronic device, and a storage medium that prevent erroneous operations or an erroneous detection not intended by a user.

According to an aspect of the present invention, an electronic device equipped with a display unit includes a touch detection unit configured to detect a touch operation performed on the display unit, an orientation detection unit configured to detect an orientation of the electronic device, and a control unit configured to perform control to: set the electronic device to a second state in a case where the electronic device is set to a first state and the detected orientation changes from a first orientation to a second orientation that is different from the first orientation, set the electronic device to the first state in a case where the detected orientation changes from the second orientation to the first orientation, perform, in a case where the electronic device is set to the first state, predetermined processing based on the touch operation performed on the display unit, and not perform, in a case where the electric device is set to the second state, the predetermined processing even if the touch operation is performed on the display unit.

According to another aspect of the present invention, an electronic device equipped with a display unit includes a touch detection unit configured to detect a touch operation performed on the display unit, a switching unit configured to switch between a display state in which the display unit displays an image with a first size and a full-screen display state in which the display unit displays an image with a second size that is larger than the first size, and a control unit configured to perform control to: perform, in a case where the image is displayed with the first size, predetermined processing based on a touch operation performed on an image display region displayed on the display unit in a case where the image is displayed with the first size, and not perform, in a case where the image is displayed with the second size, the predetermined processing even if a touch operation has been performed in the image display region displayed on the display unit.

Further features will become apparent from the following description of exemplary embodiments with reference to the attached drawings.

BRIEF DESCRIPTION OF THE DRAWINGS

FIG. 1 is a diagram illustrating an example of a configuration of a system for realizing wireless communications performed between a video camera and a smartphone.

DESCRIPTION OF THE EMBODIMENTS

Figure 2:
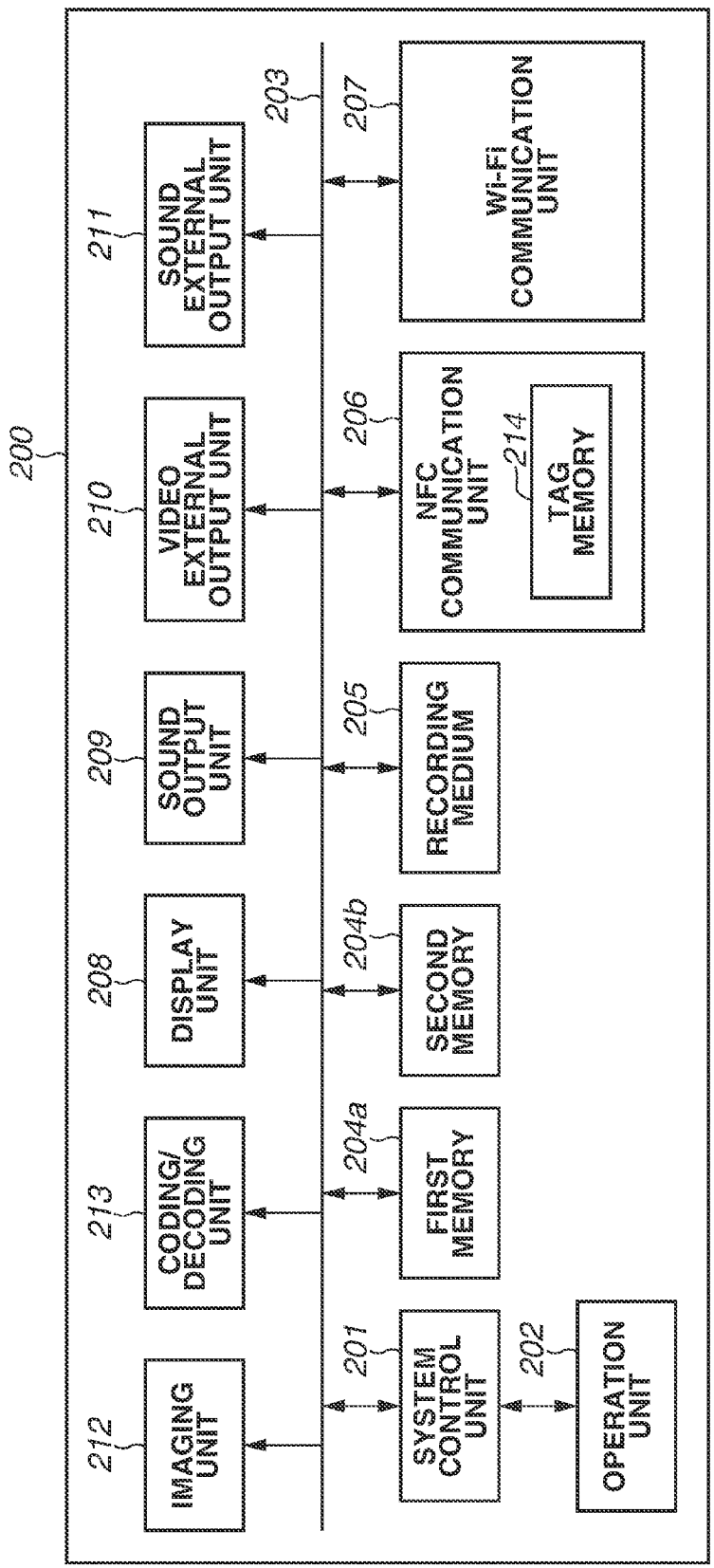
FIG. 2 is a block diagram illustrating an example of an internal configuration of a video camera according to an exemplary embodiment.

Exemplary embodiments will be described in detail below with reference to the accompanying drawings.

It is to be noted that the following exemplary embodiments are merely examples and can be appropriately modified or changed depending on individual constructions and various conditions of apparatuses. Thus, the following exemplary embodiments are not seen to be limiting.

Hereinafter, a first exemplary embodiment will be described with reference to FIGS. 1 to 6.

FIG. 1 is a diagram illustrating an example of a configuration of a system for realizing wireless communications performed between a video camera 200 and a smartphone 300. In the present exemplary embodiment, the video camera is an example of an imaging apparatus and the smartphone is an example of an electronic device.

In FIG. 1, the video camera 200 performs two types of wireless communications, i.e., NFC communications and Wi-Fi® communications, with the smartphone 300. The NFC communications are communications performed between the video camera's 200 NFC communication unit 206 and the smartphone's 300 NFC communication unit 306. The Wi-Fi® communications are performed between the video camera's 200 Wi-Fi® communication unit 207 and the smartphone's 300 Wi-Fi® communication unit 307. In the present exemplary embodiment, the video camera 200 and the smartphone 300 can perform just the NFC communications, just the Wi-Fi® communication, or both.

The video camera 200 and the smartphone 300 can perform NFC communications even when video camera's 200 NFC communication unit 206 is in a power OFF state. In this case, the smartphone's 300 NFC communication unit 306 supplies electric power to the video camera's 200 NFC communication unit 206 through electromagnetic induction to bring the video camera's 200 NFC communication unit 206 into an operable state. Therefore, the smartphone's 300 NFC communication unit 306 can perform operations for reading and writing data from and into a tag memory 214 provided in the video camera's 200 NFC communication unit 206.

The smartphone 300 includes a touch panel display device 330. The touch panel display device 330 includes a display function and a touch panel function. The display function realizes the display of image data, text data, and operation menus processed by the smartphone 300. Further, the touch panel function enables an operator to touch a desired portion of a displayed operation menu with a finger or the like to input an operation instruction to the smartphone 300, like an operation realized by operating an operation member.

The smartphone 300 also includes a switch operation unit 303. The switch operation unit 303 is configured by hardware operation members such as buttons. An operator can input an operation instruction to the smartphone 300 by operating the switch operation unit 303.

FIG. 2 is a block diagram illustrating an example of an internal configuration of the video camera 200 according to the present exemplary embodiment. In the present exemplary embodiment, the video camera 200 is an example of the imaging apparatus as described below. The imaging apparatus is a digital video camera, a digital still camera, or any other apparatus that can process image data. For example, the imaging apparatus can be a personal computer (PC), a tablet computer, a smartphone, or a workstation that includes an image capturing unit. The imaging apparatus can be any professional or business-oriented imaging apparatus that is ordinarily used in a broadcast station, a film production company, or a video production company.

A system control unit 201 is, for example, a central processing unit (CPU) or a microprocessor unit (MPU), which performs various processing according to a related program. More specifically, the system control unit 201 controls each component of the video camera 200 and controls data transmission/reception between respective components. The system control unit 201 controls each component of the video camera 200 in response to an operation signal from an operation unit 202.

The operation unit 202 is constituted by a power button, a slide switch, various buttons, a cross-key, and a touch panel. The operation unit 202 transmits an operation signal to the system control unit 201 when a user operates each operation member. A bus 203 is a general-purpose bus via which various data, control signals, and instruction signals are transmitted to respective components of the video camera 200.

A first memory 204a is, for example, a read only memory (ROM), which stores operational constants to be used by the system control unit 201 and related programs according to which the system control unit 201 performs various operations.

A second memory 204b is, for example, a random access memory (RAM) or a flash memory, which temporarily stores image signals and sound signals. Operational constants and variables of the system control unit 201 or programs read from the first memory 204a are loaded into the second memory 204b.

A recording medium 205 is a recording medium incorporated in the video camera 200. The recording medium 205 can record various data to be processed by the video camera 200. For example, a hard disk drive (HDD), a solid-state drive (SSD), an optical disk, and a flash memory are examples of the recording medium 205. In the present exemplary embodiment, for discussion purposes, the recording medium 205 is a flash memory.

The NFC communication unit 206 is a communication unit that enables the video camera 200 to perform NFC communications with the smartphone 300. When the video camera 200 and the smartphone 300 perform communications, the smartphone 300 can transmit and receive various data to be processed to and from the video camera 200. The smartphone 300 can record the above-described various data. In the present exemplary embodiment, the smartphone 300 is a target external terminal with which the NFC communication unit 206 communicates. Other external terminals can include a tablet computer, a laptop personal computer, or a desktop personal computer.

The NFC communication unit 206 includes the tag memory 214. The system control unit 201 controls data transmission/reception performed between the tag memory 214 and another component, via the bus 203 and the NFC communication unit 206. When electric power is supplied from the smartphone 300 through electromagnetic induction, the tag memory 214 can start its operation and communicate with the smartphone 300, even when the NFC communication unit 206 is in the power OFF state.

The Wi-Fi® communication unit 207 is a communication unit configured to enable the video camera 200 to perform Wi-Fi® communications with the smartphone 300 and transfer files. The Wi-Fi® communication unit 207 supports file transfer protocol (FTP). When the Wi-Fi® communication unit 207 transfers a file, the Wi-Fi® communication unit 207 serves as an FTP client that transfers the file to an FTP server. In the present exemplary embodiment, the Wi-Fi® communication unit 207 performs Wi-Fi® communications with the smartphone 300 as described below.

The video camera 200 includes a display unit 208. The display unit 208 displays image data recorded in the recording medium 205 and various graphical user interfaces (GUIs), e.g., menus. For example, a liquid crystal display device and an organic EL display device are examples of the display unit 208.

The video camera 200 includes a sound output unit 209. The sound output unit 209 includes, for example, a speaker and a driving unit. The sound output unit 209 outputs sounds based on sound signals recorded in the recording medium 205.

A video external output unit 210 is an output unit configured to connect an external display apparatus to the video camera 200. The video external output unit 210 outputs image data recorded in the recording medium 205 and various GUIs, e.g., menus, to the external display apparatus. The external display apparatus displays various images based on these data. Examples of the display apparatus include a television receiver or a monitor. In the present exemplary embodiment, the display apparatus is an external monitor.

A sound external output unit 211 is an output unit configured to connect an external sound output apparatus to the video camera 200. The sound external output unit 211 outputs a sound signal stored in the recording medium 205 to the external sound output apparatus. The external sound output apparatus outputs sounds based on the sound signal. Examples of the sound output apparatus include a speaker or a headphone. In the present exemplary embodiment, the external sound output apparatus is an external speaker.

An imaging unit 212 includes a lens, a photoelectric conversion element, and a signal processing circuit. The photoelectric conversion element converts imaging target information of incident light entered via the lens into an electric signal. The imaging unit 212 generates image data through signal processing applied on the electric signal. The system control unit 201 controls the lens position in such a way as to optimize a focus state and/or a zoom state of the lens.

A coding/decoding unit 213 generates filed data by performing compression processing on the image data generated by the imaging unit 212 according to MPEG2 standards. The coding/decoding unit 213 also generates image data by performing expansion processing on the filed data during image reproduction processing. In the compression processing, the system control unit 201 generates a stream file by adding metadata to the filed data based on a related program stored in the first memory 204a and records the generated stream file in the recording medium 205. In this case, the system control unit 201 generates a metadata file in the first memory 204a based on the program stored in the first memory 204a.

In the present exemplary embodiment, the tag memory 214 is used as a metadata storage region. The metadata is supplementary information, which is recorded when image data is recorded by the imaging unit 212 and recorded in the recording medium 205. The metadata includes information relating to the image capturing processing. For example, text information described with ASCII codes to express the content of an imaging target is available and is stored beforehand in the tag memory 214.

A user operates the operation unit 202 and instructs the video camera 200 to perform an image capturing operation. The system control unit 201 detects the instruction entered by the user and instructs each component to perform image capturing related processing via the bus 203. More specifically, the imaging unit 212 generates image data and the coding/decoding unit 213 performs processing for coding the image data. The system control unit 201 then records the coded image data as a file in the recording medium 205. In this case, the system control unit 201 instructs each component to perform metadata related processing via the bus 203. The system control unit 201 reads metadata from the tag memory 214 of the NFC communication unit 206 and records the metadata together with the image data file in the recording medium 205.

Figure 3:
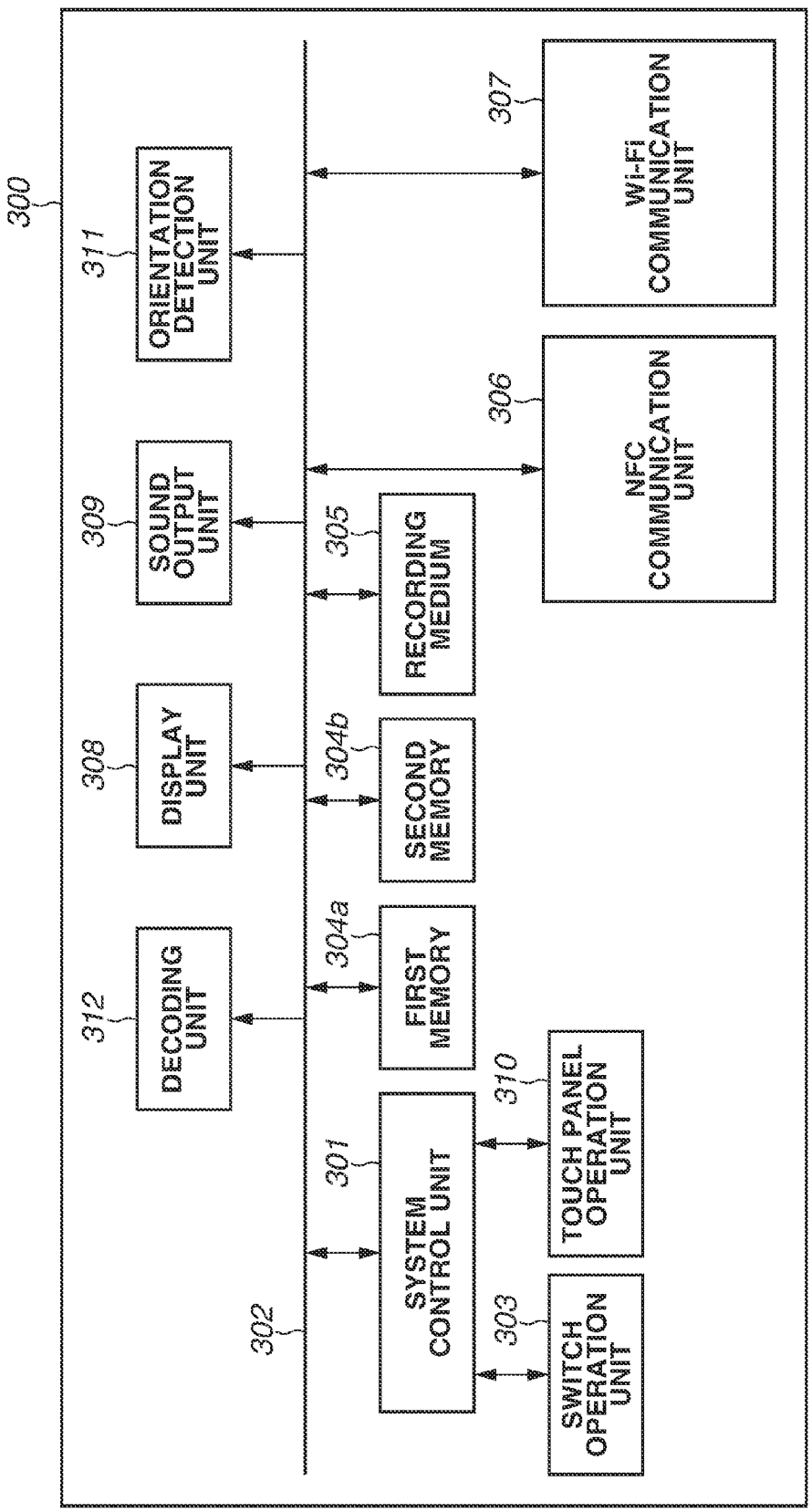
FIG. 3 is a block diagram illustrating an example of an internal configuration of a smartphone according to an exemplary embodiment.

FIG. 3 is a block diagram illustrating an example of an internal configuration of the smartphone 300 according to the present exemplary embodiment. In the present exemplary embodiment, the smartphone 300 is an example of the electronic device.

A system control unit 301 is, for example, a central processing unit (CPU) or a microprocessor (MPU), which performs various processing according to a related program. More specifically, the system control unit 301 controls each component of the smartphone 300 and controls data transmission/reception between respective components. The system control unit 301 controls each component of the smartphone 300 in response to an operation signal from the switch operation unit 303 that accepts a user operation.

The switch operation unit 303 is constituted by a power button, a slide switch, and various buttons. The switch operation unit 303 transmits an operation signal to the system control unit 301 when a user operates each operation member.

A bus 302 is a general-purpose bus via which various data, control signals, and instruction signals are transmitted to respective components of the smartphone 300.

A first memory 304a is, for example, a read only memory (ROM), which stores operational constants to be used by the system control unit 301 and related programs according to which various processing of flowcharts according to the present exemplary embodiment can be performed.

A second memory 304b is, for example, a random access memory (RAM) or a flash memory, which temporarily stores image signals and sound signals. Operational constants and variables of the system control unit 301 or programs read from the first memory 304a are loaded into the second memory 304b.

A recording medium 305 is a recording medium incorporated in the smartphone 300. The recording medium 305 can record various data to be processed by the smartphone 300. Examples of the recording medium 305 include a hard disk drive (HDD), a solid-state drive (SSD), an optical disk, or a flash memory. In the present exemplary embodiment, the recording medium 305 is a flash memory.

The NFC communication unit 306 is a communication unit that enables the smartphone 300 to perform NFC communications with the video camera 200. When the smartphone 300 and the video camera 200 perform communications, the smartphone 300 can transmit and receive various data to be processed to and from the video camera 200. The smartphone 300 can record the above-described various data.

When the video camera's 206 NFC communication unit 206 is in the power OFF state, it is still possible to cause the video camera's 200 NFC communication unit 206 to perform operations when electric power is supplied from the smartphone's 300 NFC communication unit 306 through electromagnetic induction. Thus, the video camera 200 can communicate with the smartphone 300.

The Wi-Fi® communication unit 307 is a communication unit configured to enable the smartphone 300 to perform Wi-Fi® communications with the video camera 200 to, for example, transfer files. The Wi-Fi® communication unit 307 supports FTP protocol. When the Wi-Fi® communication unit 307 transfers a file, the Wi-Fi® communication unit 307 serves as an FTP client that transfers the file to an FTP server.

The smartphone 300 includes a display unit 308. The display unit 308 displays image data recorded in the recording medium 305 and various GUIs, e.g., menus. The display unit 308 is operable as the touch panel display device 330 illustrated in FIG. 1. Exampled of the display unit 308 include a liquid crystal display device and an organic EL display.

The smartphone 300 includes a sound output unit 309. The sound output unit 309 includes, for example, a speaker and a driving unit. The sound output unit 309 outputs sounds based on sound signals recorded in the recording medium 305.

The smartphone 300 includes a touch panel operation unit 310. The touch panel operation unit 310 is operable as the touch panel display device 330 illustrated in FIG. 1. The system control unit 301 can detect the following operations and states on the touch panel operation unit 310:

A state of the touch panel being newly touched, e.g., by a finger or a stylus, which is regarded as a starting state of a touch operation (hereinafter, referred to as "Touch-Down").

A state of the touch panel being continuously touched (hereinafter, referred to as "Touch-On").

A state of the touch panel on which, for example, a finger or a pen is moving while remaining in contact with the touch panel (hereinafter, referred to as "Touch-Move").

A state of the touch panel where, for example, a finger or a pen is no longer in contact, which is regarded as a termination state of a touch operation (hereinafter, referred to as "Touch-Up").

A state of the touch panel which is not touched (hereinafter, referred to as "Touch-Off").

If a Touch-Down operation is detected, then a Touch-On operation is simultaneously detected. Unless a Touch-Up operation is detected after the Touch-Down operation, the Touch-On operation is continuously detected. If a Touch-Move operation is detected, then a Touch-On operation is simultaneously detected. If a touch position does not move when a Touch-On operation is detected, then it is determined that no Touch-Move operation has been detected. If the Touch-Up operation completes, then it is determined that a Touch-Off state exists.

The above-described operations and/or states and position coordinate information about a finger or a stylus touched on the touch panel are provided to the system control unit 301 via the internal bus. The system control unit 301 identifies each operation having been performed on the touch panel based on the provided touch detection information. The system control unit 301 can determine, based on a change in the position coordinate information, the moving direction of a finger or a stylus that moves on the touch panel during a Touch-Move operation for each of a vertical component and a horizontal component on the touch panel.

It is now assumed that a user draws a stroke on the touch panel by performing sequential Touch-Down, a Touch-Move, and Touch-Up operations. Quickly drawing a stroke is referred to as a "flick operation". In the flick operation, the user brings a finger/stylus into contact with the touch panel, quickly moves the finger/stylus a certain distance on the touch panel, and then removes the finger/stylus from the touch panel. If a detected Touch-Move operation is not less than a predetermined distance and is not less than a predetermined speed and a Touch-Up operation is subsequently detected, it can be determined that a flick operation has been performed. However, if the speed of a Touch-Move operation is less than the predetermined speed, it is determined that a drag operation has been performed regardless of the distance of the Touch-Move operation.

The touch panel can be any type of touch panel, such as a resistive membrane type, a capacitive sensing type, a surface acoustic wave type, an infrared ray type, an electromagnetic induction type, an image recognition type, or an optical sensor type. The touch panel can be configured to detect a touch operation in response to a direct touch to the touch panel or can be configured to detect a touch operation at a moment when a finger or a stylus closely approaches the touch panel. In the present exemplary embodiment, it is assumed that the touch panel operation unit 310 is a capacitive sensing type touch panel. The capacitive sensing type touch panel can erroneously detect a touch operation when, for example, a water droplet adheres to a touch surface. Even in a case where a water droplet itself is not detected as a touch operation, the capacitive sensing type touch panel can erroneously detect an incorrect position that is deviated from a position where a user has touched due to the influence of the water droplet. Accordingly, a user's intended operation may not be performed in a state where the touch surface is wet.

An orientation detection unit 311 detects the orientation of the smartphone 300. The orientation detection unit 311 includes an acceleration sensor and a peripheral circuit. The acceleration sensor measures the gravity of the earth, i.e., gravity acceleration. In other words, the orientation detection unit 311 determines whether the orientation of the smartphone 300 is portrait or landscape. The external shape of the smartphone 300 according to the present exemplary embodiment is rectangular. If the direction of two parallel longer sides of four sides constituting a rectangle is the gravity direction of the earth, i.e., when the rectangle is vertically long, the orientation detection unit 311 determines that the orientation is portrait. If the direction of two parallel longer sides is perpendicular to the gravity direction of the earth, i.e., when the rectangle is horizontally long, the orientation detection unit 311 determines that the orientation is landscape. The acceleration sensor can be replaced by another type of sensor, e.g., a gyro sensor, if it the other sensor type can determine whether the smartphone 300 is vertically or horizontally long.

A decoding unit 312 performs expansion processing on file data stored in the recording medium 305 or filed data acquired from an external device via the Wi-Fi® communication unit 307 to generate image data to be displayed by the display unit 308.

The smartphone 300 according to the present exemplary embodiment can include a waterproof exterior cover that can be attached to the main body thereof. Alternatively, the smartphone 300 can be housed in a waterproof casing that is independent from the main body thereof. The waterproof smartphone is usable in a wet environment, e.g., a bathroom or a kitchen, where the smartphone can be exposed to water droplets.

Figure 4:
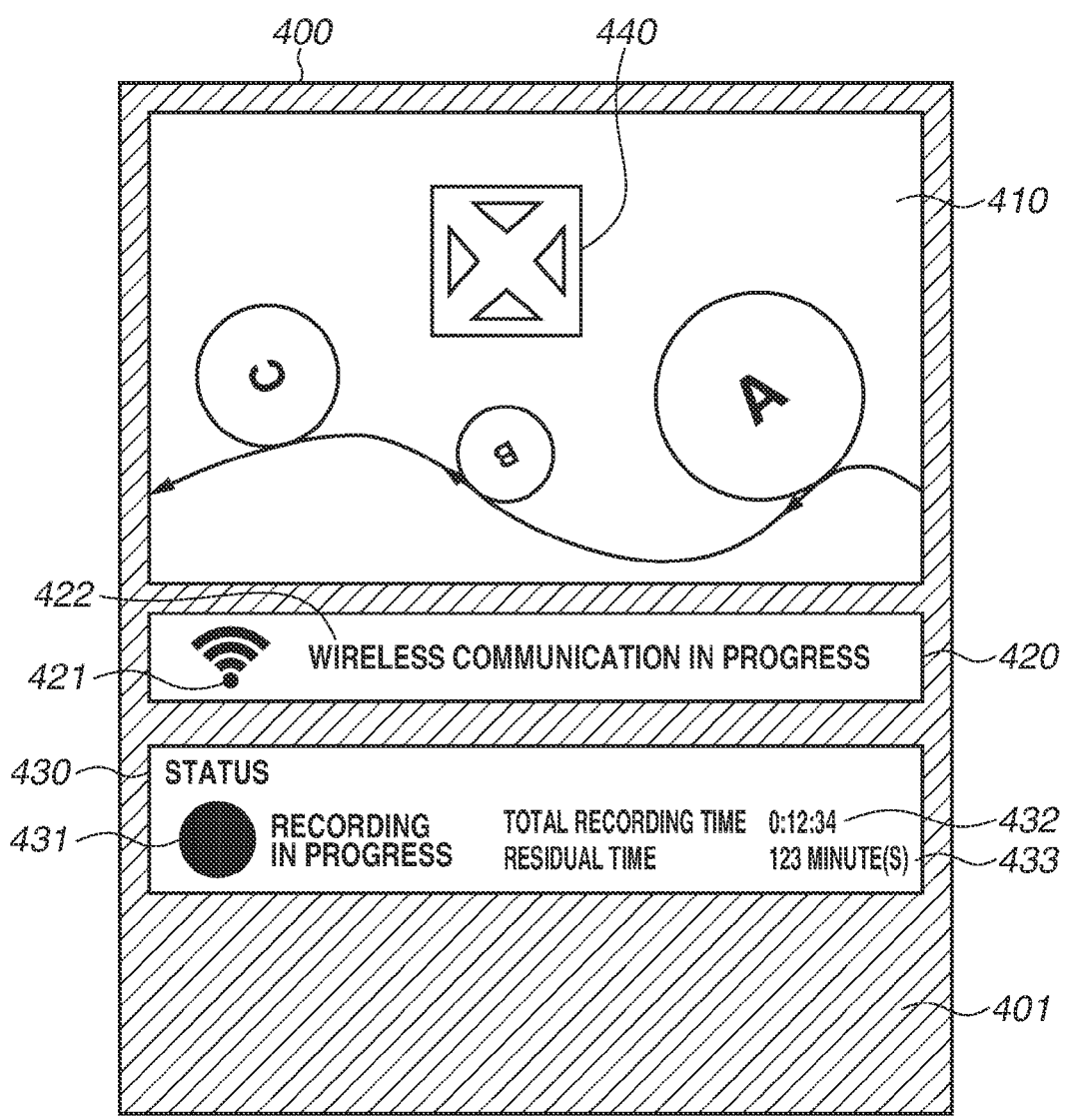
FIG. 4 is a diagram illustrating an example of a configuration of a user interface (UI) screen according to a first exemplary embodiment displayed on a touch panel display device when the orientation of a smartphone being operatively held is portrait.

FIG. 4 is a diagram illustrating an example of a configuration of a user interface (UI) screen according to the present exemplary embodiment displayed on the touch panel display device 330 when the orientation of the smartphone 300 being operatively held is portrait.

As illustrated in FIG. 4, a user interface (UI) 400 is the entire screen displayed on the touch panel display device 330 of the smartphone 300. The shape of the UI 400 is rectangular. According to the example illustrated in FIG. 4, because the orientation of the smartphone 300 being operatively held is portrait, each orientation of the touch panel display device 330 and the UI 400 is portrait.

An image display region 410 is a region in which images received by streaming are displayed. For example, live-view images captured by the video camera 200 are displayed in the image display region 410. A wireless communication state display region 420 is a region in which the state of wireless communication is displayed. A received radio wave intensity icon 421 is a display relating to the intensity of received radio waves. A wireless communication status 422 is a display relating to the state of wireless communication that is currently in progress.

A camera state display region 430 is a region in which the status of the video camera 200 is displayed. A user can operate the contents displayed in the camera state display region 430. A recording button 431 is a touch button that is operable to instruct a starting of a moving image recording operation. The recording button 431 is for a toggle operation. If the user touches the recording button 431 in a state where the recording of the video camera 200 is not yet started, the video camera 200 shifts into a recording progressing state. If the user touches the recording button 431 in a state where the recording of the video camera 200 is in progress, the video camera 200 shifts into a recording stop state. A recording time display 432 indicates continuation time of the recording progressing in the video camera 200. A residual time display 433 indicates time remaining for the recording that can be performed by the video camera 200.

A UI frame 401 has an appropriate frame shape so that the image display region 410, the wireless communication state display region 420, and the camera state display region 430 are located at predetermined positions. The UI frame 401 represents the determined entire design of the UI.

An AE icon 440 is an icon indicating a specific image region of the image display region 410, as a reference region to be subjected to in an auto exposure (AE) control. In the present exemplary embodiment, the AE control is an automatic exposure control. In an ordinary state, the AE icon 440 is in a non-display state.

If a user performs a Touch-Down operation on the specific image region, i.e., an AE control target region, of the image display region 410, the AE icon 440 is displayed for a predetermined time, e.g., five seconds, in response to the Touch-Down operation. In response to the Touch-Down operation, the video camera 200 is notified of AE control related information via the smartphone's 300 Wi-Fi® communication unit 307 and video camera's 200 Wi-Fi® communication unit 207. More specifically, the video camera 200 is notified of the AE control request information and AE control reference image coordinate information. Then, the video camera 200 performs the AE control. Subsequently, a streaming image resulting from the AE control is displayed in the image display region 410 via the video camera's 200 Wi-Fi® communication unit 207 and the smartphone's 30 Wi-Fi® communication unit 307.

Figure 5:
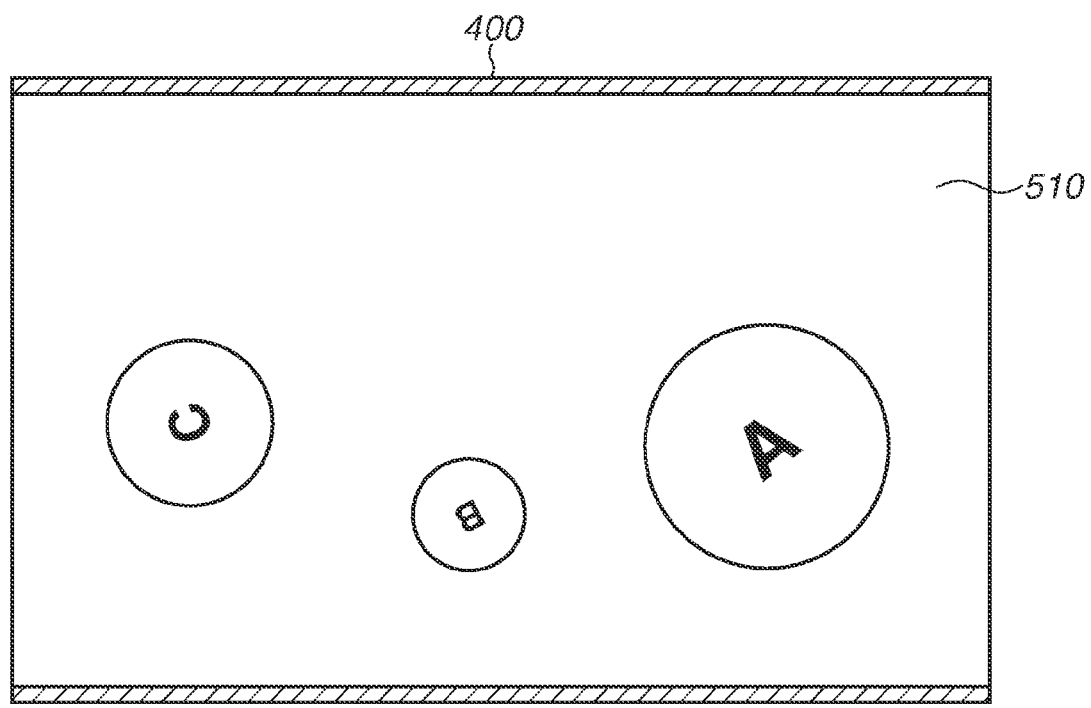
FIG. 5 is a diagram illustrating an example of a configuration of the UI screen displayed on the touch panel display device when the orientation of the smartphone being operatively held is landscape.

FIG. 5 is a diagram illustrating an example of a configuration of the UI screen according to the present exemplary embodiment displayed on the touch panel display device 330 when the orientation of the smartphone 300 being operatively held is landscape. Hereinafter, only the features different from those described in the above-described case where the orientation of the smartphone 300 being operatively held is portrait will be described in detail.

As illustrated in FIG. 5, because the orientation of the smartphone 300 being operatively held is landscape, each orientation of the touch panel display device 330 and the UI 400 is landscape. The landscape orientation corresponds to the horizontal direction of the touch panel display device 330. The portrait orientation corresponds to the vertical direction of the touch panel display device 330.

An image display region 510 is a region in which sequential images received by streaming, e.g., live-view images captured by the video camera 200, is displayed. When the orientation of the smartphone 300 is landscape, both the wireless communication state display region 420 and the camera state display region 430 are not displayed. Therefore, the maximum region of the UI 400 is available for the display of an image in the image display region 510, which is greater than the image display region 410 illustrated in FIG. 4. According to the example illustrated in FIG. 5, the display unit 308 realizes the entire screen display, i.e., full-screen display, such that the received live-view image can be entirely accommodated in a display surface of the display unit 308. In this case, the maximum size of the captured image corresponds to a smaller one of a vertical length and a horizontal length of the display surface of the display unit 308.

In the case where the orientation of the smartphone 300 is landscape, the recording button 431 is not displayed. In other words, a user cannot perform a touch operation on the recording button 431. In such a situation, the user cannot perform a recording start operation and/or a recording stop operation for the video camera 200. In the case where the orientation of the smartphone 300 is landscape, the AE icon 440 is not displayed even when a user performs a Touch-Down operation on an arbitrary image region of the image display region 510. In such a situation, the user cannot perform an AE control related operation for the video camera 200.

Figure 6:
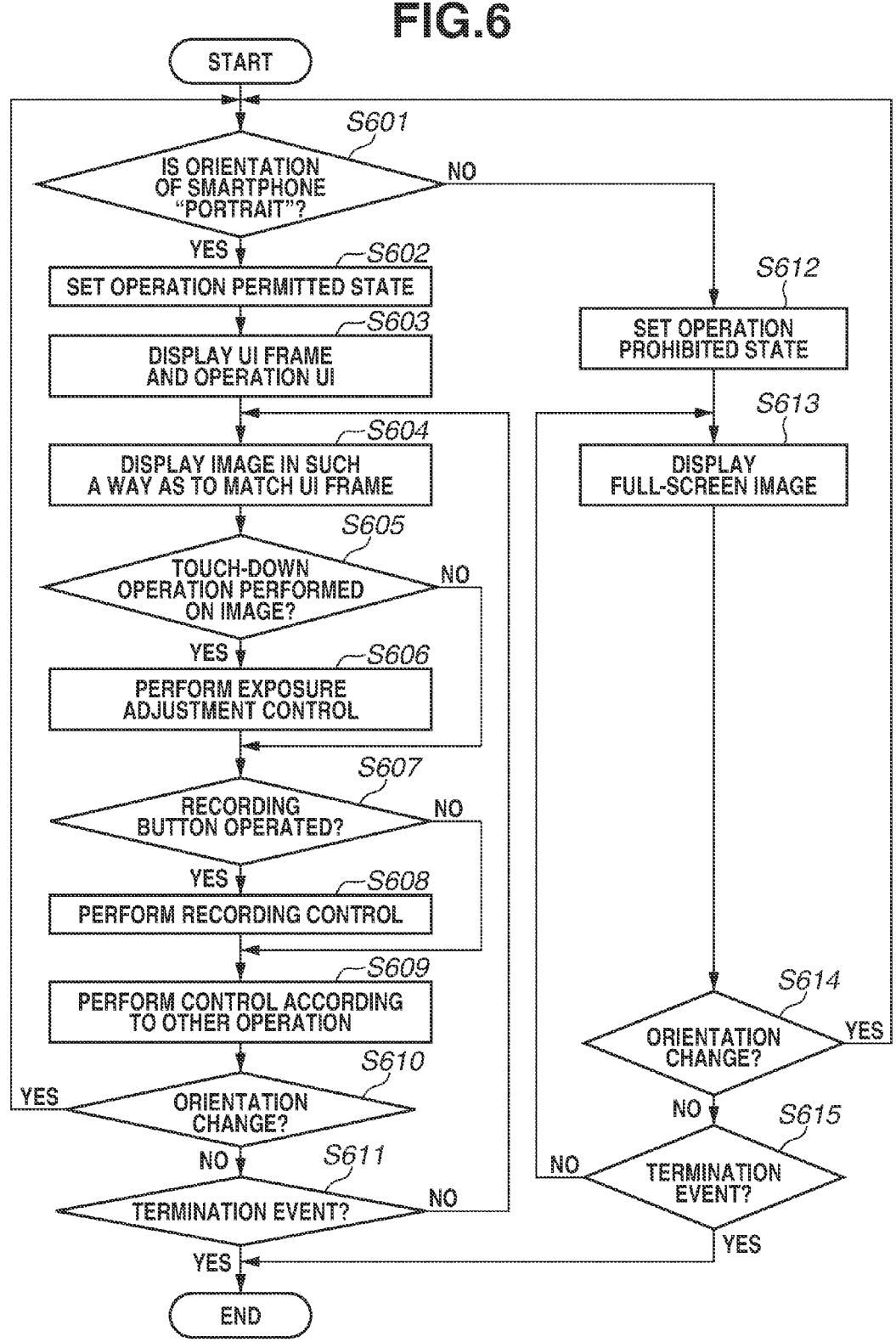
FIG. 6 is a flowchart illustrating an example of a processing procedure of a remote controller operation for recording a moving image according to the first exemplary embodiment.

FIG. 6 is a flowchart illustrating an example of a processing procedure of a remote controller operation performed by the system control unit 301 of the smartphone 300 according to the present exemplary embodiment. Each process of the flowchart illustrated in FIG. 6 is realized by the system control unit 301 executing a related program loaded into the second memory 304b from the first memory 304a. According to the exemplary processing illustrated in FIG. 6, the video camera 200 performs a moving image capturing operation and the smartphone 300 requests the video camera 200 to transmit streaming video images.

First, in step S601, the system control unit 301 acquires an orientation detection result from the orientation detection unit 311 via the bus 302 and detects the orientation of the smartphone 300. If the orientation detection result indicates "portrait" (YES in step S601), the operation proceeds to step S602. If the orientation detection result indicates "landscape" (NO in step S601), the operation proceeds to step S612.

Processing in steps S602 through S611 is detailed contents of sequential processing to be performed when the orientation of the smartphone 300 is portrait. In step S602, the system control unit 301 sets an operation permitted state, in which a user operation entered via the touch panel operation unit 310 is validated to perform each designated control. Subsequently, in step S603, the system control unit 301 causes the display unit 308 to display a user interface frame (hereinafter, referred to as "UI frame") and an operation UI. More specifically, the UI frame 401, the image display region 410, the wireless communication state display region 420, the received radio wave intensity icon 421, the wireless communication status 422, the camera state display region 430, the recording button 431, the recording time display 432, and the residual time display 433 are displayed on the display unit 308.

Next, in step S604, the system control unit 301 performs a display control to display an image in such a way as to match the UI frame 401 and the image display region 410 displayed in step S603. The image displayed in step S604 is an image, e.g., a live-view image transmitted to the smartphone's 300 Wi-Fi® communication unit 307 via the video camera's 200 Wi-Fi® communication unit 207. The smartphone 300 acquires filed data via the Wi-Fi® communication unit 307 and controls the decoding unit 312 to perform expansion processing on the acquired filed data. The system control unit 301 controls the display unit 308 to display the resultant expanded image.

Next, in step S605, the system control unit 301 determines whether a Touch-Down operation has been performed in the image display region 410. The system control unit 301 checks for the presence of the Touch-Down operation because the user can accurately designate a desired coordinate point in the image display region 410. If the system control unit 301 is configured to check for the presence of a Touch-Up operation, as in step S607 described below, in the above-described determination, the position of a detected finger/stylus may deviate from the Touch-Down point. The system control unit 301 can detect a coordinate point that is different from the coordinate of the Touch-Down operation. Therefore, in the present exemplary embodiment, the system control unit 301 checks for the presence of the Touch-Down operation, i.e., an operation including no Touch-Move operation, in the above-described determination.

If a determination result in step S605 indicates that the Touch-Down operation has been performed in the image display region 410 (YES in step S605), the operation proceeds to step S606. In step S606, the system control unit 301 acquires information about the coordinate position where the Touch-Down operation has been performed and performs an exposure adjustment control. The following is detailed processing to be performed in step S606. First, the system control unit 301 generates exposure adjustment execution request information and designated coordinate position information based on the acquired coordinate position information. Then, the system control unit 301 transmits the generated information to the video camera's 200 Wi-Fi® communication unit 207 via the Wi-Fi communication unit 307. The video camera 200 performs luminance gain adjustment for the imaging unit 212 based on the exposure adjustment execution request information and the designated coordinate position information acquired via the Wi-Fi® communication unit 207. The video camera 200 adjusts the luminance gain in such a way as to set appropriate luminance for the designated position and peripheral positions thereof, based on the information about the designated coordinate position on the captured image. If the determination result in step S605 indicates that the Touch-Down operation has not been performed in the image display region 410 (NO in step S605), the operation proceeds to step S607.

In step S607, the system control unit 301 determines whether a Touch-Up operation has been performed on the recording button 431. If a determination result in step S607 indicates that the Touch-Up operation has been performed on the recording button 431 (YES in step S607), the operation proceeds to step S608. In step S608, the system control unit 301 performs a recording control. In the determination in step S607, if the Touch-Up position is in a valid region of the recording button 431, the operation proceeds to step S608. Thus, a Touch-Move operation is not taken into consideration even if the Touch-Move operation has been performed before the Touch-Up operation. More specifically, if the position where the Touch-Up operation has been performed is on the recording button 431, the operation proceeds to step S608 regardless of the detection of a Touch-Move operation.

The following is detailed processing performed in step S608. First, the system control unit 301 acquires recording control state information about the video camera 200 via the video camera's 200 Wi-Fi communication unit 207® and the smartphone's 300 Wi-Fi® communication unit 307. The recording control state information about the video camera 200 is information indicating whether the video camera 200 is in the recording progressing state or in the recording stop state. If the acquired recording control state information indicates the recording stop state, the system control unit 301 notifies the video camera 200 of recording start request information via the smartphone's 300 Wi-Fi® communication unit 307 and the video camera's 200 Wi-Fi® communication unit 207. If the acquired recording control state information indicates the recording progressing state, the system control unit 301 notifies the video camera 200 of recording stop request information in a similar manner. If the determination result in step S607 indicates that the Touch-Up operation has not been performed on the recording button 431 (NO in step S607), the operation proceeds to step S609.

In step S609, the system control unit 301 detects whether any other operation have been performed. If the system control unit 301 detects that another operation has been performed, the system control unit 301 performs various controls based on the detected operation. Other operations can include a setting operation for an image capturing, such as focus control, zoom control based on a zoom operation, up/wide control based on an up/wide operation, pan control based on a pan operation performed on a camera pan table or a pan head (not illustrated), or an image capturing control based on a still image capturing operation.

Next, in step S610, the system control unit 301 acquires the orientation detection result from the orientation detection unit 311 and determines whether the orientation of the smartphone 300 has changed. If the determination result in step S610 indicates a change in the orientation (YES in step S610), the operation returns to step S601, and the system control unit 301 determines again whether the orientation of the smartphone 300 is portrait or landscape. If the determination result in step S610 indicates no change in the orientation (NO in step S610), the operation proceeds to step S611.

In step S611, the system control unit 301 detects for the presence of a termination event. The termination event can occur when the system control unit 301 runs other operating system software. Examples of the termination event include a user operation to terminate the application software executing the processing illustrated in FIG. 6 via the switch operation unit 303, a detection of reduced residual amount of a battery (not illustrated), and a user operation to turn off the power source of the smartphone 300. The termination event can occur due to an application factor. For example, the termination event can occur in a case where the Wi-Fi® communication has been forcibly terminated in communication management processing (not illustrated). If a detection result in step S611 indicates that the termination event is not present (NO in step S611), the operation returns to step S604. In step S604, the system control unit 301 updates the image display to match the UI frame 401. If the termination event has occurred (YES in step S611), the system control unit 301 terminates the processing of the flowchart illustrated in FIG. 6.

Processing in steps S612 through S615 is detailed contents of sequential processing to be performed when the orientation of the smartphone 300 is landscape. In step S612, the system control unit 301 sets an operation prohibited state, in which a user operation entered via the touch panel operation unit 310 is invalidated to prevent the designated control from being performed. In this state, the AE icon 440 is not displayed, even if the user performs a Touch-Down operation on an arbitrary image region of the image display region 510. In this state, a touch operation (or tap operation) to instruct starting or stopping the recording of a moving image is inhibited. The application software executing the processing illustrated in FIG. 6 is brought into a touch operation invalidated state. When a touch operation is performed, each functional control corresponding to the touch operation cannot be performed. However, in this case, interrupt processing is validated if the OS, i.e., another software that is different from the application software executing the processing illustrated in FIG. 6, requests the interrupt processing.

Next, in step S613, the system control unit 301 performs a full-screen display of an image in the entire region of the UI 400. If the orientation of the displayed image is portrait, the system control unit 301 displays an image obtainable by rotating the image displayed in step S604 90 degrees clockwise or counterclockwise, i.e., a direction corresponding to the orientation.

Next, in step S614, the system control unit 301 acquires the orientation detection result from the orientation detection unit 311 and determines whether the orientation of the smartphone 300 has changed. If a determination result in step S614 indicates a change in the orientation (YES in step S614), the operation returns to step S601. In step S601, the system control unit 301 determines again whether the orientation of the smartphone 300 is portrait or landscape. If the determination result in step S614 indicates no change in the orientation (NO in step S614), the operation proceeds to step S615.

In step S615, the system control unit 301 detects for the presence of a termination event. The processing to be performed in step S615 is similar to the processing performed in step S611. If a determination result in step S615 indicates that the termination event is not present (NO in step S615), the operation returns to step S613. In step S613, the system control unit 301 updates the full-screen display of the image. If the determination result in step S615 indicates that the termination event is present (YES in step S615), the system control unit 301 terminates the processing of the flowchart illustrated in FIG. 6.

As described above, the system control unit 301 according to the present exemplary embodiment prohibits the control corresponding to a user operation entered via the touch panel operation unit 310 from being performed if the orientation of the smartphone 300 is landscape and permits the control if the orientation of the smartphone 300 is portrait. Therefore, elimination of erroneous operation or erroneous detection of the touch panel can be achieved.

Further, a user can switch a predetermined touch operation between "valid" and "invalid" by changing the orientation of the smartphone 300. Therefore, switching between "prohibition" and "permission" with a simple and secure operation can be realized. The user can easily identify whether the smartphone 300 is presently in the operation prohibited state or in the operation permitted state because the operation UI is not displayed in the operation prohibited state. The user can browse still images and moving images in the full-screen display because the operation UI is not displayed. Therefore, the present exemplary embodiment provides improved usability to each user. Every user can enjoy the above-described advantageous features by simply changing the orientation of the smartphone 300.

In the present exemplary embodiment, the operation UI is not displayed in the touch operation prohibited state. However, in another exemplary embodiment, the operation UI can instead be displayed in a grayed out state.

The first exemplary embodiment has been described based on a live-view display based image capturing operation. The above-described control can be similarly applied to an image reproduction operation. When a moving image is reproduced, a system according to a second exemplary embodiment validates a touch operation to accept a user operation relating to the moving image if the orientation of the smartphone 300 is portrait and invalidates the touch operation if the orientation of the smartphone 300 is landscape to prevent browsing from being interrupted by an erroneous operation, as described below. A smartphone and a digital camera according to the second exemplary embodiment have characteristic configurations similar to those described in the first exemplary embodiment. Therefore, redundant description thereof will be avoided.

Figure 7:
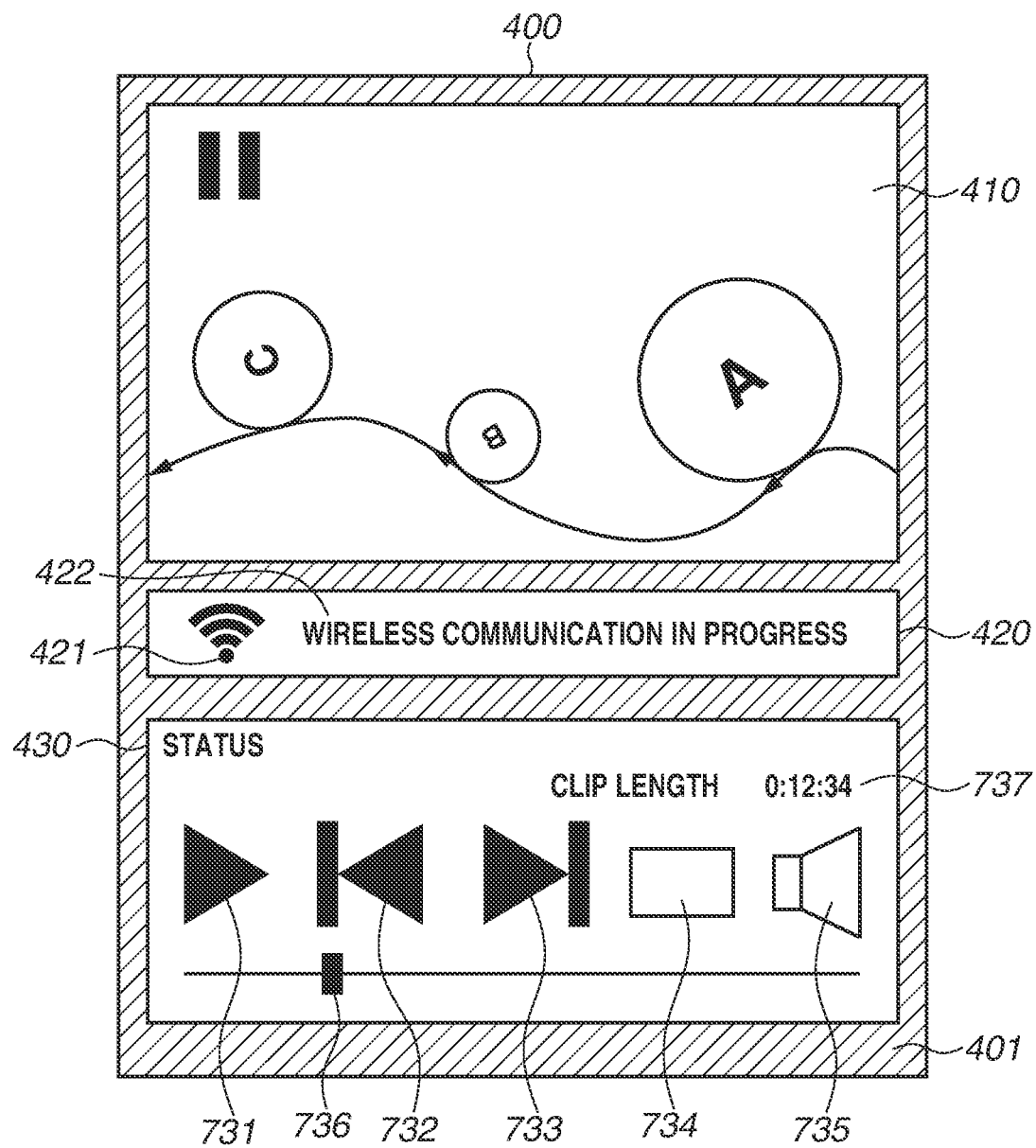
FIG. 7 is a diagram illustrating an example of a configuration of a UI screen according to a second exemplary embodiment displayed on a touch panel display device when the orientation of a smartphone being operatively held is portrait.

FIG. 7 is a diagram illustrating an example of a configuration of a UI screen displayed on the touch panel display device 330 according to the present exemplary embodiment, when the orientation of the smartphone 300 being operatively held is portrait. In FIG. 7, portions similar to those illustrated in FIG. 4 are denoted by the same reference numerals. Therefore, redundant description thereof will be avoided. A UI screen displayed on the touch panel display device 330 when the orientation of the smartphone 300 is landscape is similar to that illustrated in FIG. 5. Therefore, redundant description thereof will be avoided.

In the present exemplary embodiment, the smartphone 300 acquires a plurality of moving image files (clips) stored in the video camera's 200 recording medium 205 via the video camera's 200 Wi-Fi® communication unit and the smartphone's 300 Wi-Fi® communication unit. Then, a user selects one of the above-described plurality of moving image files to cause the display unit 308 of the smartphone 300 to display a moving image. The moving image to be displayed is not limited to the moving image acquired from the video camera's 200 recording medium 205 and can be a moving image stored in the smartphone's 300 recording medium 305 or a moving image streamed from a server.

In FIG. 7, a reproduction button 731 is a touch button that is operable to instruct (or start) reproduction of a moving image displayed in the image display region 410. If the moving image displayed in the image display region 410 is in a stopped state, the displayed reproduction button 731 serves as a reproduction start instruction button. If the moving image displayed in the image display region 410 is in a reproduction progressing state, the displayed reproduction button 731 serves as a reproduction stop instruction button. In a case where a tap operation is performed on the reproduction button 731, that is if a user sequentially performs a Touch-Down operation and a Touch-Up operation on the reproduction button 731, the smartphone 300 starts reproducing the moving image if the moving image is in the stopped state and stops reproducing the moving image if the moving image is in the reproduction progressing state.

A clip length display 737 indicates a recording time length of a presently selected clip, i.e., the moving image displayed in the image display region 410. If a tap operation is performed on a clip feed button 733 when the reproduction of a moving image is ready or when the reproduction start position is the head of the moving image, the system control unit 301 selects one previous clip from a list of a plurality of clips recorded in the video camera's 200 recording medium 205. More specifically, the clip feed button 733 is functionally operable as a button that switches the moving image displayed in the image display region 410 to another moving image. Further, the clip feed button 733 is functionally operable as a cueing button that movies the reproduction position to the head of the displayed moving image if a tap operation is performed in a state where the reproduction of a moving image is currently in progress or when the reproduction stopped position of a moving image is a position other than the head.

A clip reversing button 732 is a touch button that, if a tap operation is performed on the clip reversing button 732, the system control unit 301 selects one preceding clip, i.e., the next moving image. More specifically, the clip reversing button 732 is functionally operable as a button that switches the moving image displayed in the image display region 410 to another moving image.

A display size switching button 734 is a touch button operable to switch the display of a moving image to the full-screen display. If a tap operation is performed on the display size switching button 734, the moving image is displayed at the full-screen size in the same manner as the full-screen display realized when the orientation of the smartphone 300 is landscape. However, in a case where the orientation of the smartphone 300 is the vertical direction, a user can instruct starting or stopping the reproduction of a moving image by touching the image display region comparable to the full-screen size. In other words, the touch operation is not invalid in this case. Alternatively, to prevent the reproduction of a moving image from being started or stopped, a touch operation performed on the image display region irrespective of the orientation of the smartphone 300 can be invalidated in a case where the smartphone 300 displays the full-screen size moving image (similar to the image displayed when the orientation is landscape) in response to a user operation on the display size switching button 734. A volume button 735 is a touch button operable to adjust the sound volume of a moving image. A seek bar 736 is a display item that indicates the present reproduction position of a moving image and changes the reproduction position based on a touch and slide operation, i.e., a Touch-Move operation. If a user performs a tap operation at an arbitrary position of the seek bar 736, the reproduction position can be changed to the tapped position immediately.

Figure 8:
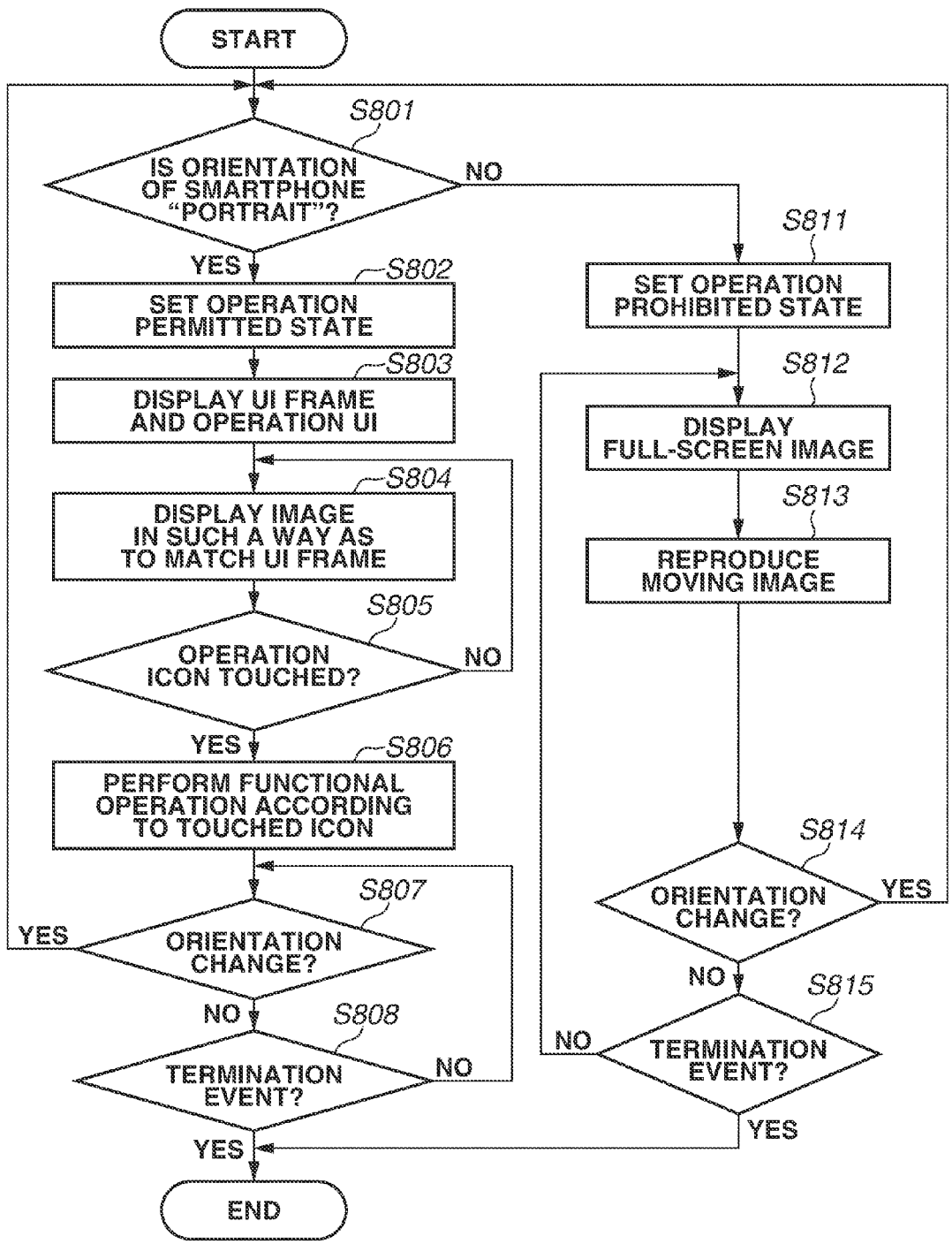
FIG. 8 is a flowchart illustrating an example of a processing procedure of a moving image reproduction operation according to the second exemplary embodiment.

FIG. 8 is a flowchart illustrating an example of a processing procedure of a moving image reproduction operation performed by the system control unit 301 of the smartphone 300 according to the present exemplary embodiment. Each process of the flowchart illustrated in FIG. 8 is realized by the system control unit 301 executing a related program loaded into the second memory 304b from the first memory 304a.

Processing to be performed in steps S801 to S804 is similar to the above-described processing performed in steps S601 to S604 illustrated in FIG. 6. Thus, redundant description thereof will be avoided. However, the image displayed in the image display region 410 is a stopped video of a reproduced moving image, i.e., a frame image in a pause state, or a reproduced video, namely not a live-view image.

In step S805, the system control unit 301 determines whether there is a tap operation performed on any operation icon, i.e., one of the reproduction button 731 through the seek bar 736. If a determination result in step S805 indicates that the tap operation has been performed on any one of the operation icons (YES in step S805), the operation proceeds to step S806. If the determination result in step S805 indicates that no tap operation has been performed (NO in step S805), the operation proceeds to step S807.

In step S806, the system control unit 301 performs a functional operation based on the tapped icon. For example, the system control unit 301 starts reproducing the moving image being in the stopped state in the image display region 410 if the tap operation has been performed on the reproduction button 731. For example, the system control unit 301 performs a clip feed control if the tap operation has been performed on the clip feed button 733.

In the present exemplary embodiment, the system control unit 301 performs the clip feed control on a moving image file recorded in the video camera's 200 recording medium 205. First, the system control unit 301 generates clip feed execution request information and transmits the generated information to the video camera's Wi-Fi® communication unit 207 via the Wi-Fi communication unit 307. The video camera 200 acquires a moving image file from the recording medium 205 according to the clip feed execution request information received via the Wi-Fi® communication unit 207 and transmits the acquired moving image file to the smartphone 300.

For example, the system control unit 301 performs a clip reversing control if the tap operation has been performed on the clip reversing button 732. In the present exemplary embodiment, the system control unit 301 performs the clip reversing control on the moving image file recorded on the recording medium 205 of the video camera 200 according to the following procedure. First, the system control unit 301 generates clip reversing execution request information and transmits the generated information to the video camera's 200 Wi-Fi® communication unit 207 via the Wi-Fi® communication unit 307. The video camera 200 acquires a moving image file from the recording medium 205 based on the clip reversing execution request information received via the Wi-Fi® communication unit 207 and transmits the acquired moving image file to the smartphone 300.

The system control unit 301 performs a control similar to that described with reference to FIG. 7 if the tap operation has been performed on any other operation icon, i.e., one of the display size switching button 734 through the seek bar 736. Next, processing performed in steps S807 and S808 is similar to the above-described processing performed in steps S610 and S611 illustrated in FIG. 6 and thus redundant description thereof will be avoided.

If the orientation of the smartphone 300 is landscape, then in step S811, the system control unit 301 sets an operation prohibited state, in which a user operation entered via the touch panel operation unit 310 is invalidated to prevent the designated control from being performed. In this state, reproduction of the moving image cannot be stopped or restarted and the sound volume cannot be changed even when the user touches a landscape image display region (similar to the image display region 510 illustrated in FIG. 5). Various operation icons, e.g., the display items corresponding to the reproduction button 731 through the seek bar 736, which enable the user to instruct various moving image related operations, are not displayed. In short, the application software executing the processing illustrated in FIG. 8 is brought into the touch operation invalidated state. When a touch operation is performed, teach functional control corresponding to the touched operation is inhibited from being performed. However, in this case, interrupt processing is validated if the OS, i.e., another software that is different from the application software executing the processing illustrated in FIG. 8, requests the interrupt processing.

Next, in step S812, the system control unit 301 displays a full-screen image in the display region of the UI 400. The display region of the full-screen image is similar to the image described with reference to FIG. 5. The image displayed in step S812 is comparable to an image obtainable by rotating the image displayed in step S804 90 degrees clockwise or counterclockwise, i.e., the direction corresponding to the orientation.

Next, in step S813, the system control unit 301 starts moving image reproduction processing. In this case, even when the orientation of the smartphone 300 is portrait and the smartphone 300 is in the moving image reproduction stopped state, the user can cause the smartphone 300 to automatically start the moving image reproduction processing by changing the orientation of the smartphone 300 from portrait to landscape. Accordingly, the user can select a desired reproduction position by manipulating the seek bar 736 when the orientation of the smartphone 300 is portrait.

Subsequently, the user can change the orientation of the smartphone 300 from portrait to landscape to cause the smartphone 300 to start the moving image reproduction processing from the start position indicated by the seek bar 736.

In the present exemplary embodiment, the smartphone 300 automatically starts the moving image reproduction processing in response to the orientation change of the smartphone 300 from portrait to landscape. Alternatively, the smartphone 300 can be configured to hold the reproduction stopped state without starting the moving image reproduction processing. In this case, the user instructs the smartphone 300 to start the moving image reproduction processing in the portrait state before holding the smartphone 300 in the landscape state, so that the user can browse the reproduced moving image in the landscape state without any erroneous operation.

Processing to be performed in steps S814 and S815 is similar to the processing performed in steps S614 and S615 illustrated in FIG. 6. Therefore, redundant description thereof will be avoided. If a determination result in step S814 indicates that the orientation of the smartphone 300 has changed (YES in S814), the operation returns to step S801. If the determination result in step S814 indicates no change in the orientation (NO in step S814), the operation proceeds to step S815. If a determination result in step S815 indicates that the termination event has not been detected (NO in step S815), the operation returns to step S812. If the determination result in step S815 indicates that the termination event has been detected (YES in step S815), the system control unit 301 terminates the processing of the flowchart illustrated in FIG. 8.

As described above, according to the present exemplary embodiment, each user can cause the smartphone 300 to perform the moving image reproduction processing by simply changing the orientation of the smartphone 300. Therefore, the user can enjoy excellent operability. Compared to the case where the smartphone 300 performs the moving image reproduction processing in response to a touch panel operation, erroneous touch panel operations and erroneous touch panel determinations can be eliminated because the system according to the present exemplary embodiment can perform the moving image reproduction processing without requiring a user's touch panel operation. As a result, the user can browse the moving image comfortably.

Hereinafter, a third exemplary embodiment will be described in detail. A system according to the third exemplary embodiment performs a slideshow of still images. Hereinafter, features not described in the second exemplary embodiment will be mainly described below. A smartphone and a digital camera according to the present exemplary embodiment have characteristic configurations similar to those described in the first exemplary embodiment. Therefore, redundant description thereof will be avoided.

Figure 9:
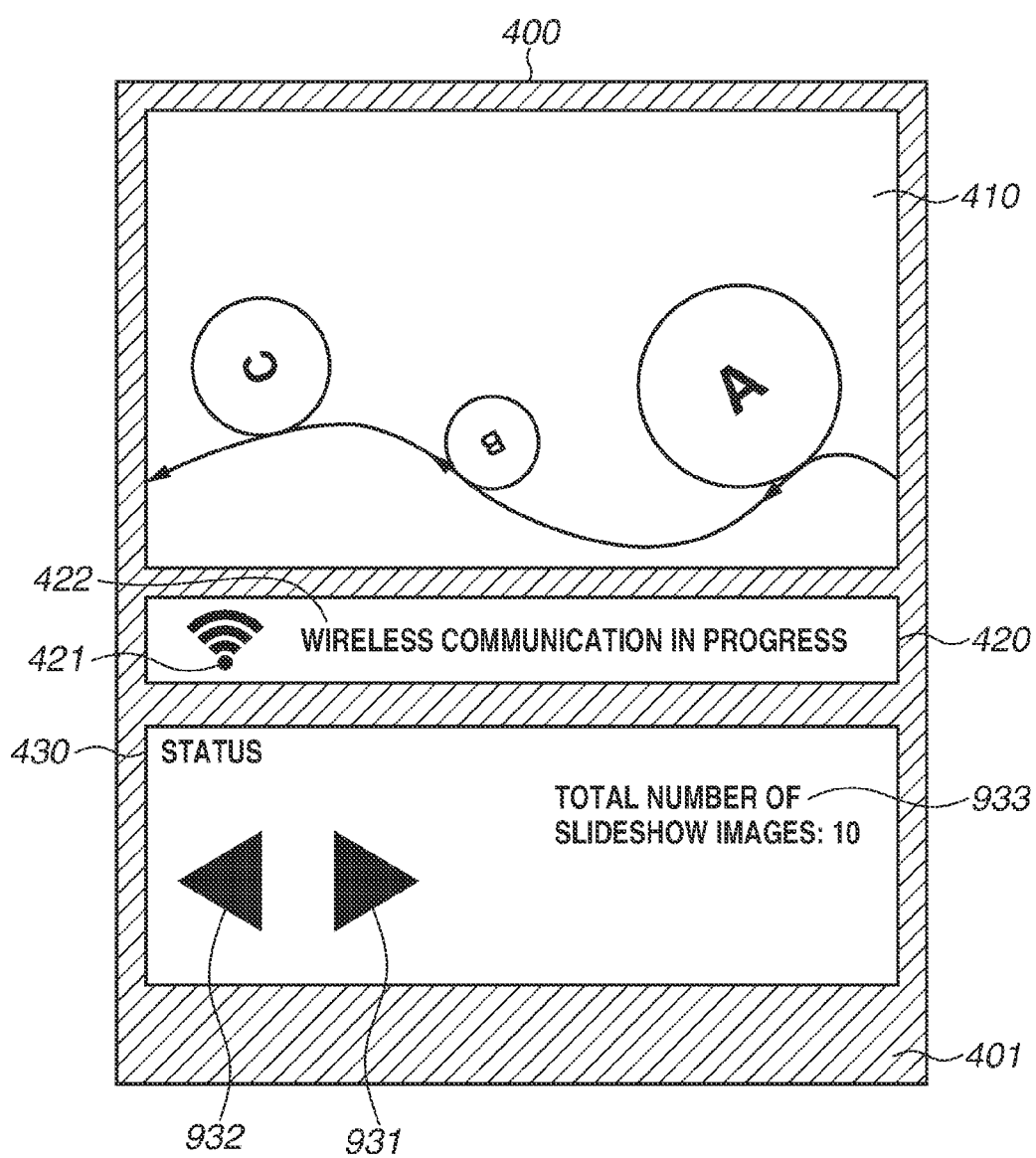
FIG. 9 is a diagram illustrating an example of a configuration of a UI screen according to a third exemplary embodiment displayed on a touch panel display device when the orientation of a smartphone being operatively held is portrait.

FIG. 9 is a diagram illustrating an example of a configuration of a UI screen according to the present exemplary embodiment displayed on the touch panel display device 330 when the orientation of the smartphone 300 being operatively held is portrait. In FIG. 9, portions similar to those illustrated in FIG. 4 are denoted by the same reference numerals. Therefore, redundant description thereof will be avoided. A UI screen displayed on the touch panel display device 330 when the orientation of the smartphone 300 being operatively held is landscape is similar to that illustrated in FIG. 5. Therefore, redundant description thereof will be avoided.

In the present exemplary embodiment, the video camera 200 captures still images in addition to moving images based on each operation of a shutter button (not illustrated) and records still image files in the recording medium 205. The smartphone 300 acquires a plurality of still image files from the video camera's 200 recording medium 205 via the Wi-Fi® communication unit 207 and the smartphone's 300 Wi-Fi® communication unit 307. In this way, a user can browse a slideshow of the acquired plurality of still image files.

In FIG. 9, if a user performs a tap operation on a photo feed button 931, the smartphone 300 selects one following still image file from a list of the plurality of still image files recorded in the video camera's 200 recording medium 205. If a user performs a tap operation on a photo reversing button 932, the smartphone 300 selects one preceding still image file. A slideshow number-of-images display 933 indicates the total number of still images that constitute the slideshow, i.e., the present display target.

Figure 10:
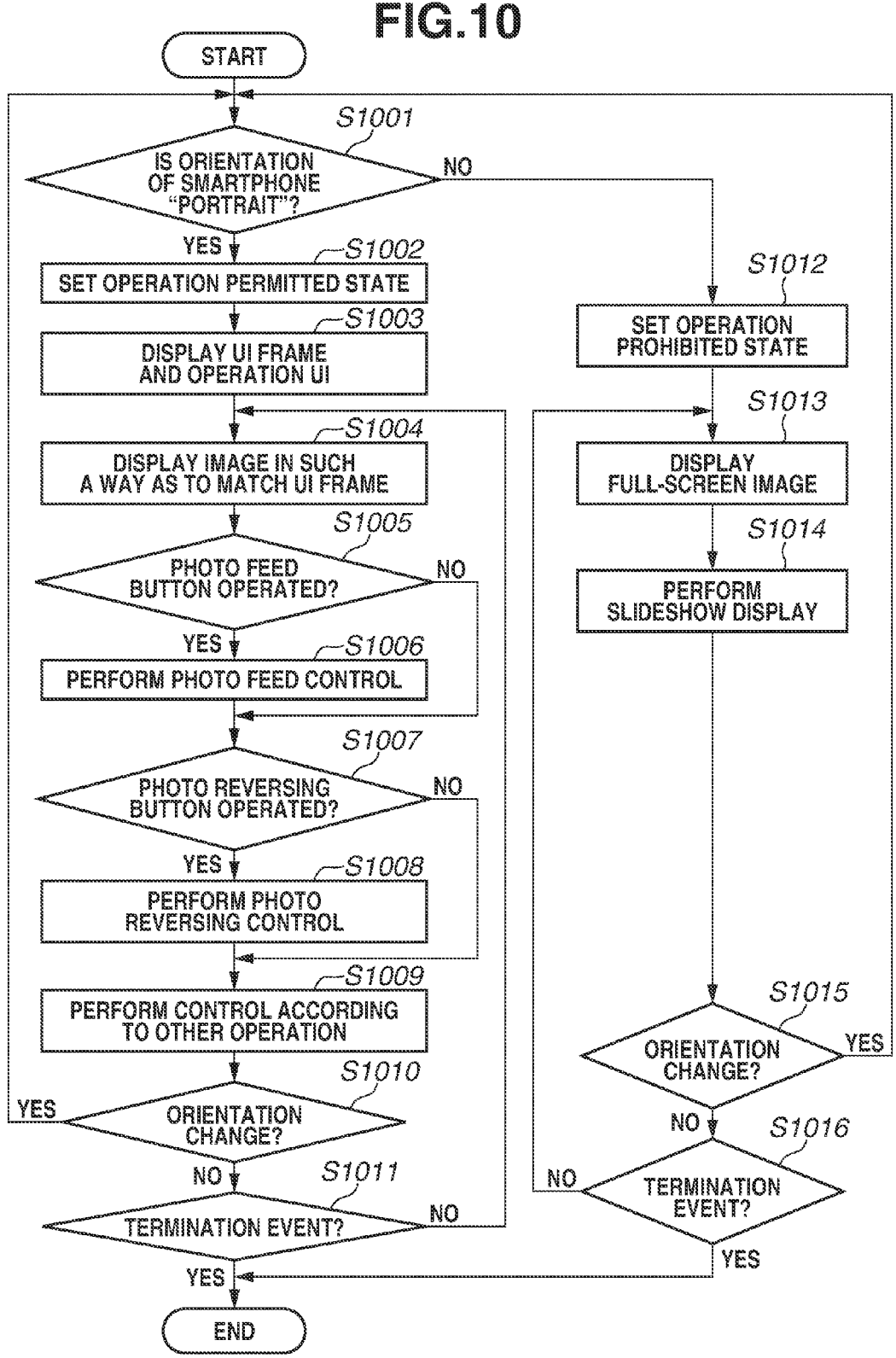
FIG. 10 is a flowchart illustrating an example of a processing procedure for displaying a slideshow of still images according to the third exemplary embodiment.

FIG. 10 is a flowchart illustrating an example of a processing procedure for displaying a slideshow of still images performed by the system control unit 301 of the smartphone 300 according to the present exemplary embodiment. Each process in the flowchart illustrated in FIG. 10 is realized by the system control unit 301 executing a related program loaded into the second memory 304b from the first memory 304a.

Processing to be performed in steps S1001 to S1004 is similar to the processing performed in steps S601 to S604 illustrated in FIG. 6. Thus, redundant description thereof will be avoided. In the present exemplary embodiment, still images that cooperatively constitute the slideshow are displayed in step S1004. Therefore, the system control unit 301 does not perform a slideshow display at this moment.

In step S1005, the system control unit 301 determines whether a tap operation has been performed on the photo feed button 931. If a determination result in step S1005 indicates that the tap operation has been performed (YES in step S1005), the operation proceeds to step S1006. In step S1006, the system control unit 301 performs a photo feed control as described below. First, the system control unit 301 generates photo feed execution request information and transmits the photo feed execution request information to the video camera's 200 Wi-Fi® communication unit 207 via the Wi-Fi® communication unit 307. The video camera 200 acquires a still image file from the recording medium 205 based on the photo feed execution request information acquired via the Wi-Fi® communication unit 207 and transmits the acquired still image file to the smartphone 300. If the determination result in step S1005 indicates that the tap operation has not been performed (NO in step S1005), the operation proceeds to step S1007.

In step S1007, the system control unit 301 determines whether there a tap operation has been performed on the photo reversing button 932. If a determination result in step S1007 indicates that the tap operation has been performed (YES in step S1007), the operation proceeds to step S1008. In step S1008, the system control unit 301 performs a photo reversing control as described below. First, the system control unit 301 generates photo reversing execution request information and transmits the photo reversing execution request information to the video camera's 200 Wi-Fi® communication unit 207 via the Wi-Fi® communication unit 307. The video camera 200 acquires a still image file from the recording medium 205 based on the acquired photo reversing execution request information received via the Wi-Fi® communication unit 207 and transmits the acquired still image file to the smartphone 300. If the determination result in step S1007 indicates that the tap operation has not been performed (NO in step S1007), the operation proceeds to step S1009.

Processing to be performed in steps S1009 to S1013 is similar to the processing performed in steps S609 to S613 illustrated in FIG. 6. Subsequently, in step S1014, the system control unit 301 performs the slideshow display of each still image file acquired from the video camera's 200 recording medium 205. In this case, the system control unit 301 requests the video camera 200 to transmit still image files sequentially at predetermined time intervals. Then, the system control unit 301 acquires and displays respective still image files according to the above-described procedure. Processing to be performed in steps S1015 and S1016 is similar to the processing performed in steps S614 and S615 illustrated FIG. 6.

As described above, according to the present exemplary embodiment, each user can enjoy excellent operability because the user can control the smartphone 300 to perform a slideshow of still images by simply changing the orientation of the smartphone 300. Compared to the case where the smartphone 300 performs the slideshow display in response to a touch panel operation, erroneous touch panel operations and erroneous touch panel determinations can be eliminated because the system according to the present exemplary embodiment can perform the slideshow without requiring a user's touch panel operation. As a result, the user can browse the still images comfortably.

Although the exemplary live-view display, the exemplary moving image reproduction, and the exemplary slideshow have been described in the above-described exemplary embodiments, these exemplary embodiments are not limiting. Additional exemplary embodiments are applicable to other electronic devices that invalidate a tap operation relating to a predetermined function, i.e., a touch operation not including a Touch-Move operation, when the orientation is one of portrait and landscape and validates the tap operation relating to the predetermined function when the orientation is the other. It is effective in a situation that displayed contents are browsable irrespective of the presence of a user operation in the tap operation invalidated orientation. Time-sequentially progressing data, e.g., a moving image or a slideshow of still images, is an example of such contents. Sound data and automatic scrolling/automatic page turning of document data, e.g., text data, book data, cartoon data, or cooking recipe data, are other examples.

In the above-described respective exemplary embodiment, a user can determine whether to invalidate a touch operation when the orientation of the electronic device is landscape. For example, a function of invalidating the touch operation in the landscape orientation is selectively set to ON or OFF beforehand based on a user instruction. In this case, if the function setting is ON, the system performs the predetermined control as described in the above-described respective exemplary embodiments. If the function setting is OFF, the system accepts a touch operation even when the orientation is landscape and performs the control in response to the touch operation in the same manner as in the portrait orientation.

In the above-described respective exemplary embodiments, the system invalidates a tap operation that does not include a Touch-Move operation based on the orientation of an electronic device. It is regarded that an operation accompanied by a Touch-Move operation is not an erroneous operation because such an operation is seldom induced by water droplets or user's unintended touch operation. The system according to the exemplary embodiments prevents any control from being performed in response to an operation induced by water droplets or a user's unintended touch operation by invalidating a tap operation not accompanied by a Touch-Move operation, i.e., a function to be performed based on a Touch-Down operation or a Touch-Up operation.

The entire control of the system control unit 301 can be realized by a single hardware device or can be shared by a plurality of hardware devices. While exemplary embodiments have been described, these exemplary embodiments are merely examples, and are not seen to be limiting. For example, to the above-described exemplary embodiments can be combined.

The above-described exemplary embodiments have been described based on a smartphone. However, any other electronic device that invalidates a tap operation relating to a predetermined function, i.e., a touch operation not including a Touch-Move operation, in one orientation and validates the tap operation relating to the predetermined function in the other orientation is applicable. For example, personal digital assistants (PDAs), portable image viewers, digital photo frames, music players, game machines, and electronic book readers.

Additional exemplary embodiments can be realized through the processing including supplying a program capable of realizing at least one function of the above-described exemplary embodiments to a system or an apparatus via a network or a storage medium and causing at least one processor of a computer of the system or the apparatus to read and execute the program. A circuit (e.g., ASIC) can be configured to realize at least one function of the exemplary embodiments.

According to the exemplary embodiments, an erroneous operation or an erroneous detection not intended by a user can be prevented.

Other Embodiments

Embodiment(s) can also be realized by a computer of a system or apparatus that reads out and executes computer executable instructions (e.g., one or more programs) recorded on a storage medium (which may also be referred to more fully as a 'nontransitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-250331, filed Dec. 22, 2015, which is hereby incorporated by reference herein in its entirety.

What is claimed is:

1. An electronic device equipped with a display unit, comprising:
   a processor; and
   a memory configured to store a program that, when executed by the processor, causes the electronic device to function as:
   a touch detection unit configured to detect a touch operation performed on the display unit;
   an orientation detection unit configured to detect an orientation of the electronic device; and
   a control unit configured to perform control to:
   set the electronic device to a second state in a case where the electronic device is set to a first state and the detected orientation changes from a first orientation to a second orientation that is different from the first orientation,
   set the electronic device to the first state in a case where the detected orientation changes from the second orientation to the first orientation,
   perform, in a case where the electronic device is set to the first state, predetermined processing based on the touch operation performed on the display unit, and
   not perform, in a case where the electric device is set to the second state, the predetermined processing even if the touch operation is performed anywhere on a screen of the display unit.

2. The electronic device according to claim 1, wherein the first state is a state in which the touch operation performed on the display unit is validated, and
   wherein the second state is a state in which the touch operation performed on the display unit is invalidated.

3. The electronic device according to claim 1, wherein the control unit performs the predetermined processing based on a touch operation performed on an image display region in the first state, and
   wherein the control unit does not perform the predetermined processing in the second state even if the touch operation is performed on the image display region.

4. The electronic device according to claim 1, wherein the second orientation is perpendicular to the first orientation and is obtainable by rotating the electronic device 90 degrees around an axis perpendicular to a display surface of the display unit.

5. The electronic device according to claim 1, wherein the control unit selectively sets the electronic device to the first state or the second state based on whether the detected orientation of the electronic device is the first orientation or the second orientation.

6. The electronic device according to claim 1, wherein the processor further causes the electronic device to function as a display control unit configured to control the display unit to display a captured live image,
   wherein the control unit performs control, based on the touch operation performed on the display unit in a case where the electronic device is set the first state, to instruct to perform image capturing related processing as the predetermined processing.

7. The electronic device according to claim 6, wherein the captured live image is a moving image, and wherein the image capturing related processing is an operation to start recording of the moving image or an operation to stop the recording of the moving image.

8. The electronic device according to claim 6, wherein the image capturing related processing is an operation to adjust a specific image capturing setting, and wherein, in the case where the electronic device is set to the first state, based on a touch operation performed on a region where the captured live image is displayed on the display unit, the control unit performs control to instruct to adjust the specific image capturing setting with reference to a position where the touch operation has been performed.

9. The electronic device according to claim 8, wherein the specific image capturing setting is at least exposure control, zoom control, focus control, or control relating to a pan head of an imaging apparatus that generates the captured live image.

10. The electronic device according to claim 6, wherein the processor further causes the electronic device to function as a communication unit configured to communicate with an external imaging apparatus,
wherein the display control unit controls the display unit to display a live image captured by the external imaging apparatus and received by the communication unit, and
wherein, in a case where the detected orientation of the electronic device is the first orientation, the control unit instructs the external imaging apparatus, via the communication unit, to perform the image capturing related processing based on a touch operation detected by the touch detection unit.

11. The electronic device according to claim 1, wherein the processor further causes the electronic device to function as a reproduction unit configured to reproduce a time-sequentially progressing content,
wherein the predetermined processing is processing relating to reproduction of the time-sequentially progressing content.

12. The electronic device according to claim 11, wherein the predetermined processing is at least reproduction start of the time-sequentially progressing content, reproduction stop of the time-sequentially progressing content, selection of another content, switching to full-screen display of the time-sequentially progressing content, sound volume adjustment, or reproduction position change of the time-sequentially progressing content.

13. The electronic device according to claim 11, wherein the control unit starts or stops reproduction of a moving image based on a touch operation performed on a moving image display region in the case where the electronic device is set to the first state, and
wherein the control unit does not start or stop the reproduction of the moving image in the case where the electronic device is set to the second state even if the touch operation is performed on the image display region.

14. The electronic device according to claim 11, wherein the control unit controls the reproduction unit to start the reproduction of the time-sequentially progressing content in response to the detected orientation changing to the second orientation.

15. The electronic device according to claim 11, wherein the time-sequentially progressing content is at least a moving image, a still image for a slideshow, sound data, or book data.

16. The electronic device according to claim 1, wherein the first orientation is an orientation in which the display unit is vertically long, and
wherein the second orientation is an orientation in which the display unit is horizontally long.

17. The electronic device according to claim 1, wherein the control unit displays a display item to accept a touch operation in a case where the orientation of the electronic device is the first orientation, and
wherein the control unit does not display the display item in a case where the orientation of the electronic device is the second orientation.

18. The electronic device according to claim 1, wherein the control unit controls the display unit to display an image with a first size in a case where the orientation of the electronic device is the first orientation, and
wherein the control unit controls the display unit to displays the image with a second size, which is larger than the first size, in response to the orientation changing from the first orientation to the second orientation.

19. The electronic device according to claim 1, wherein, in the case where the electronic device is set to the first state, the control unit performs the predetermined processing based on a touch operation not including movement of a touch position on the display unit, and
wherein, in the case where the electric device is set to the second state, the control unit does not perform the predetermined processing even if the touch operation not including the touch position movement is performed on the display unit.

20. The electronic device according to claim 1, wherein the processor further causes the electronic device to function as a setting unit configured to set, based on the detected orientation, whether to control whether a touch operation is allowed,
wherein, in a case where the setting indicates not to control whether the touch operation is allowed, the control unit does not set the electronic device to the second state even if the orientation changes from the first orientation to the second orientation.

21. A method for controlling an electronic device that includes a display unit, the method comprising:
setting the electronic device to a second state in a case where the electronic device is set to a first state and a detected orientation changes from a first orientation to a second orientation that is different from the first orientation;
setting the electronic device to the first state in a case where the detected orientation changes from the second orientation to the first orientation;
performing, in a case where the electronic device is set to the first state, predetermined processing based on the touch operation performed on the display unit; and
not performing, in a case where the electric device is set to the second state, the predetermined processing even if the touch operation is performed anywhere on a screen of the display unit.

22. A non-transitory computer readable storage medium storing computer executable instructions that causes a computer execute a method for controlling an electronic device that includes a display unit, the method comprising:

setting the electronic device to a second state in a case where the electronic device is set to a first state and the detected orientation changes from a first orientation to a second orientation that is different from the first orientation;

setting the electronic device to the first state in a case where the detected orientation changes from the second orientation to the first orientation;

performing, in a case where the electronic device is set to the first state, predetermined processing based on a touch operation performed on the display unit; and not performing, in a case where the electric device is set to the second state, the predetermined processing even if the touch operation is performed anywhere on a screen of the display unit.

23. An electronic device equipped with a display unit, comprising:

a processor; and a memory configured to store a program that, when executed by the processor, causes the electronic device to function as:

a touch detection unit configured to detect a touch operation performed on the display unit;

a switching unit configured to switch between a display state in which the display unit displays an image with a first size and a full-screen display state in which the display unit displays an image with a second size that is larger than the first size; and a control unit configured to perform control to:

perform, in a case where the image is displayed with the first size, predetermined processing based on a touch operation performed on an image display region displayed on the display unit in a case where the image is displayed with the first size, and not perform, in a case where the image is displayed with the second size, the predetermined processing even if a touch operation has been performed in the image display region displayed anywhere on a screen of the display unit.

24. A method for controlling an electronic device equipped with a display unit, the method comprising:

detecting a touch operation performed on the display unit;

switching between a display state in which the display unit displays an image with a first size and a full-screen display state in which the display unit displays an image with a second size that is larger than the first size;

performing, in a case where the image is displayed with the first size, predetermined processing according to a touch operation performed on an image display region displayed on the display unit; and not performing, in a case where the image is displayed with the second size, the predetermined processing even if a touch operation has been performed in the image display region displayed anywhere on a screen of the display unit.

25. A non-transitory computer readable storage medium storing computer executable instructions that causes a computer to execute a method for controlling an electronic device equipped with a display unit, the method comprising:

detecting a touch operation performed on the display unit;

switching between a display state in which the display unit displays an image with a first size and a full-screen display state in which the display unit displays an image with a second size that is larger than the first size;

performing, in a case where the image is displayed with the first size, predetermined processing according to a touch operation performed on an image display region displayed on the display unit; and not performing, in a case where the image is displayed with the second size, the predetermined processing even if a touch operation has been performed in the image display region displayed anywhere on a display of the display unit.

* * * * *